(12) United States Patent
Ball et al.

(10) Patent No.: US 8,110,148 B2
(45) Date of Patent: Feb. 7, 2012

(54) APPARATUS AND METHOD USING ROTARY FLOW DISTRIBUTION MECHANISMS

(75) Inventors: Carroll Edward Ball, Los Angeles, CA (US); Arkadij M. Elizarov, Woodland Hills, CA (US); Hartmuth C. Kolb, Playa Del Rey, CA (US); Reza Miraghaie, Culver City, CA (US); Jianzhong Zhang, Brea, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 230 days.

(21) Appl. No.: 12/612,091

(22) Filed: Nov. 4, 2009

(65) Prior Publication Data

US 2010/0113762 A1 May 6, 2010

Related U.S. Application Data

(60) Provisional application No. 61/111,862, filed on Nov. 6, 2008.

(51) Int. Cl.
*B01J 19/00* (2006.01)
*B01J 10/00* (2006.01)
*B01J 12/00* (2006.01)
*B01J 14/00* (2006.01)

(52) U.S. Cl. ......... 422/130; 422/129; 422/131; 422/159

(58) Field of Classification Search .......... 422/129–131, 422/159, 209, 211; 536/28, 53, 122, 28.53; 544/276, 360; 546/16; 548/356.5, 556.5; 558/454; 562/452
See application file for complete search history.

(56) References Cited

U.S. PATENT DOCUMENTS

| | | | |
|---|---|---|---|
| 3,881,872 A * | 5/1975 | Naono | ............................. 422/64 |
| 4,147,533 A | 4/1979 | Flinn et al. | |
| 4,536,121 A | 8/1985 | Stewart et al. | |
| 4,948,565 A | 8/1990 | Bemis et al. | |
| 5,413,227 A | 5/1995 | Diebold et al. | |
| 5,679,580 A | 10/1997 | Ball et al. | |
| 5,988,603 A | 11/1999 | McCampbell et al. | |
| 6,431,976 B1 | 8/2002 | Auquier | |
| 6,436,720 B1 * | 8/2002 | Oberbeck et al. | ............. 436/180 |

(Continued)

FOREIGN PATENT DOCUMENTS

EP 1188476 9/2001

(Continued)

OTHER PUBLICATIONS

Lu et al, Micro-reactors for PET Tracer Labeling, 2007, Springer Berlin Heidelberg, PET Chemistry, Springer Series on Biofilms, vol. 64, pp. 271-287.*
RSC Publishing; Highlights in Chemical Technology; Instant Insight: Probing radioactive research Apr. 14, 2009; pp. 1-2.

(Continued)

*Primary Examiner* — Walter D Griffin
*Assistant Examiner* — Natasha Young
(74) *Attorney, Agent, or Firm* — Joshua B. Ryan

(57) ABSTRACT

Methods and apparatus for facilitating the synthesis of compounds in a batch device are presented. Application of the batch type microfluidic devices to the synthesis of radiolabeled compounds is described. These methods and apparatus enable the selective introduction of multiple reagents via an enhanced rotary flow distribution valve through a single inlet port of the synthetic device. The sequential introduction of multiple reagents through a single inlet port allows an optimal delivery of highly concentrated reagents into the reactor and facilitates the synthesis of the desired products with a minimal loss of materials during transfers, which is critical to the synthesis of radiolabeled biomarkers.

30 Claims, 9 Drawing Sheets

U.S. PATENT DOCUMENTS

| | | | |
|---|---|---|---|
| 6,808,162 B2 * | 10/2004 | Tranovich et al. | 251/209 |
| 6,845,968 B2 * | 1/2005 | Killeen et al. | 251/304 |
| 7,144,568 B2 | 12/2006 | Ricard et al. | |
| 7,413,709 B2 * | 8/2008 | Roitman et al. | 422/504 |
| 2003/0116206 A1 * | 6/2003 | Hartshorne et al. | 137/625.46 |
| 2003/0162304 A1 | 8/2003 | Dority et al. | |
| 2006/0185419 A1 * | 8/2006 | Gamache et al. | 73/23.41 |
| 2008/0064110 A1 | 3/2008 | Elizarov et al. | |
| 2008/0281090 A1 | 11/2008 | Lee et al. | |
| 2009/0036668 A1 | 2/2009 | Elizarov et al. | |
| 2009/0050713 A1 | 2/2009 | Matveev | |
| 2009/0095635 A1 | 4/2009 | Elizarov et al. | |
| 2009/0118112 A1 | 5/2009 | Ozaki | |

FOREIGN PATENT DOCUMENTS

| | | | |
|---|---|---|---|
| EP | 1188476 A2 * | 3/2002 | |
| EP | 1447136 | 2/2004 | |
| EP | 1447136 A1 * | 8/2004 | |
| WO | WO 2008/128201 | 10/2008 | |

OTHER PUBLICATIONS

Manuel Miro, Elo Harald Hansen; Trends in Analytical Chemistry, vol. 25, No. 3, 2006; Solid reactors in sequential injection analysis: recent trends in the environmental field; pp. 267-281.

E. Phillip Horwitz; Extraction Chromatographty of actinides and Selected Fission Products: Principles and Achievement of Selectivity; pp. 2-6, (2010).

Dr. Mauricio Rostagno; Chemistry Analytical Chemistry; Monolithic columns for fast high-performance liquid chromatography separations; Feb. 14, 2009; pp. 1-4.

David C. P. Cobben, MD, et al.; F-FLT PET for Visualization of Laryngeal Cancer: Comparison with [18] F-FDG PET; The Journal of Nuclear Medicine; vol. 45, No. 2, Feb. 2004; pp. 226-231.

Philip W. Miller; Radiolabelling with short-lived PET (positron emission tomography) isotopes using microfluidic reactors; J. Chem Technol Biotechnol 2009; 84: 309-315; 2008 Society of Chemical Industry.

International Search Report in PCT/US2009/063329 dated May 14, 2010.

* cited by examiner

APPARATUS AND METHOD USING ROTARY FLOW DISTRIBUTION MECHANISMS

CLAIM TO PRIORITY

The present application is based on and claims priority to U.S. provisional application No. 61/111,862, filed Nov. 6, 2008, which is hereby incorporated by reference in its entirety herein.

The foregoing application, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

FIELD OF THE INVENTION

The present invention relates generally to batch devices and methods for chemical processes using rotary flow distribution mechanisms and related technologies. More specifically, the present invention relates to methods and microfluidic devices using rotary flow distribution mechanisms.

BACKGROUND DISCUSSION

Devices, such as microfluidic devices have been used for the preparation of a number of compounds, which may be used in medical imaging applications, such as Positron Emission Tomography (PET) systems, that create images based on the distribution of positron-emitting isotopes in the tissue of a patient. The isotopes are typically administered to a patient by injection of probe molecules that comprise a positron-emitting isotope, such as Fluorine-18, covalently attached to a molecule that is readily metabolized or localized in the body or that chemically binds to receptor sites within the body.

SUMMARY OF THE INVENTION

One embodiment of the present invention is directed to an apparatus, or chip, that may be used for carrying out a multistep chemical process. This apparatus comprises a reaction chamber and one or more inlet or outlet ports configured to allow delivery and removal of a gas and/or liquids, or a mixture thereof, into or from the reaction chamber. The reagents may be delivered into the reaction chamber via a rotary valve capable of being connected to multiple reagent/solvent/gas lines and interfaced with the reaction chamber inlet port to allow selective delivery of an appropriate reagent to the reaction chamber.

Another embodiment of the present invention is directed to an apparatus for carrying out chemical processes ("the apparatus"). The apparatus comprises a reaction chamber and a lid. The lid covers the reaction chamber and has one or more lid ports that allow delivery and/or removal of a gas and/or a liquid, or a mixture thereof into or from the reaction chamber. The apparatus also has one or more chamber ports configured to be selectively aligned with an appropriate fluid line carrying a gas and/or a liquid, or a mixture thereof, into or from the reaction chamber via at least one rotary valve.

Yet another embodiment of the present invention is directed to the apparatus wherein the rotary valve comprises a stator and a rotor.

Yet another embodiment of the present invention is directed to the apparatus wherein the stator is stationary.

Yet another embodiment of the present invention is directed to the apparatus wherein the rotor is interfaced with a stator via solid-solid contact and mechanical seal.

Yet another embodiment of the present invention is directed to the apparatus wherein a servo-motor is used to rotate the valve rotor.

Yet another embodiment of the present invention is directed to the apparatus wherein the chamber port may be aligned with a selected fluid line by rotation of a valve rotor having a channel capable of providing a connection between the chamber port and the selected fluid line.

Yet another embodiment of the present invention is directed to the apparatus wherein the rotary valve has a movable interface with a side of the reactor chamber to allow selective alignment of the chamber port with an appropriate fluid line carrying a gas and/or a liquid, or a mixture thereof, into or from the reaction chamber.

Yet another embodiment of the present invention is directed to the apparatus wherein at least one chamber port is aligned with the selected fluid line by rotation of the rotary valve.

Yet another embodiment of the present invention is directed to the apparatus wherein at least one chamber port allows removal of a gas and/or liquids, or a mixture thereof, from the reaction chamber.

Yet another embodiment of the present invention is directed to the apparatus wherein at least one lid port is configured to allow delivery of a pressurized gas into the reaction chamber.

Yet another embodiment of the present invention is directed to the apparatus wherein one of the rotary valves is activated by a rotary actuator.

Yet another embodiment of the present invention is directed to the apparatus wherein the rotary actuator is pneumatic.

Yet another embodiment of the present invention is directed to the apparatus wherein the apparatus is microfluidic.

Yet another embodiment of the present invention is directed to the apparatus wherein the chemical process is radiosynthesis.

Yet another embodiment of the present invention is directed to the apparatus wherein the one or more chamber ports are sealed.

Yet another embodiment of the present invention is directed to the apparatus wherein the one or more lid ports are sealed.

Another embodiment of the present invention is directed toward the apparatus described above, wherein multiple reactors are connected in a variable configuration. The configuration includes sequential, parallel, splitting into multiple paths for creating libraries, or network.

Yet another embodiment of the present invention is directed to an apparatus comprising a reaction chamber, a lid, a single inlet chamber port and a single outlet chamber port ("the single inlet/single outlet apparatus".) The lid has two lid ports configured to allow delivery or removal of a gas and/or a vapor into or from the reaction chamber. The single inlet chamber port is configured to be selectively aligned with an appropriate fluid line, carrying a gas and/or a liquid, or a mixture thereof, into the reaction chamber, via a multiline rotary valve. The single outlet chamber port is configured to allow removal of the reaction products from the reaction chamber via a rotary valve.

Yet another embodiment of the present invention is directed to the single inlet/single outlet apparatus wherein the apparatus is microfluidic.

Yet another embodiment of the present invention is directed to the single inlet/single outlet apparatus wherein the chemical process is radiosynthesis.

Yet another embodiment of the present invention is directed to a method for a chemical process conducted in an apparatus ("the method") and comprising the steps of:
a) delivering the reagents into a reaction chamber via one or more chamber inlet ports selectively aligned with an appropriate fluid line carrying a gas and/or a liquid, or a mixture thereof, into the reaction chamber via at least one rotary valve;
b) processing the reagent(s) to generate a desired product; and
c) eluting the product via one or more outlet chamber outlet ports via corresponding rotary valves.

Yet another embodiment of the present invention is directed to the method wherein the apparatus is microfluidic.

Yet another embodiment of the present invention is directed to the method wherein the chemical process is radiosynthesis.

Yet another embodiment of the present invention is directed to a method comprising the following steps:
a) delivering reagents into the chamber via a single inlet reaction chamber port configured to be selectively aligned with an appropriate fluid line carrying the a gas and/or a liquid, or a mixture thereof, into the reaction chamber via a single rotary valve;
b) processing the reagent(s) to generate a desired product; and
c) eluting the product via a single outlet chamber port via a corresponding rotary valve.

Yet another embodiment of the present invention is directed to the method described immediately above wherein the reaction chamber is microfluidic.

Yet another embodiment of the present invention is directed to the method described immediately above wherein the chemical process is radiosynthesis.

Yet another embodiment of the present invention is directed to a synthetic chip comprising a reactor and a lid, wherein the chip is configured to be compressed and/or sealed between two reagent distribution members or a reagent distribution member and a hard stop.

Yet another embodiment of the present invention is directed to the chip wherein the reagent distribution member is a rotary valve.

Yet another embodiment of the present invention is directed to the chip wherein at least one reagent distribution member is a stator.

Yet another embodiment of the present invention is directed to the chip wherein at least one reagent distribution member is a rotor.

These and other various embodiments of the present invention, together with the organization and manner of operation thereof, will become apparent from the following detailed description when taken in conjunction with the accompanying drawings. The entire disclosures of all patents and references cited throughout this application are incorporated herein by reference in their entirety.

It is noted that in this disclosure and particularly in the claims and/or paragraphs, terms such as "comprises", "comprised", "comprising" and the like can have the meaning attributed to it in U.S. patent law; e.g., they can mean "includes", "included", "including", and the like; and that terms such as "consisting essentially" of and "consists essentially of" have the meaning ascribed to them in U.S. patent law, e.g., they allow for elements not explicitly recited, but exclude elements that are found in the prior art or that affect a basic or novel characteristic of the invention.

BRIEF DESCRIPTION OF THE DRAWINGS

Embodiments of the invention are described by referring to the attached drawings, in which.

DETAILED DESCRIPTION

Figure 1:
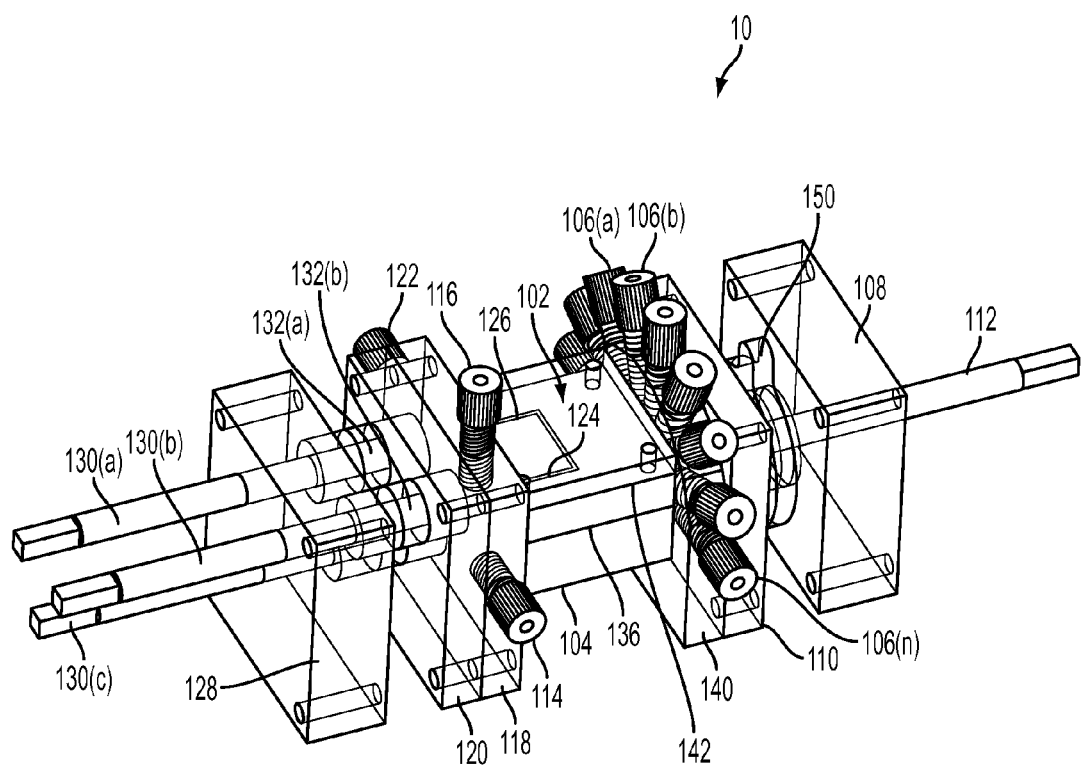
FIG. 1 illustrates a device according to an embodiment of the present invention.

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

There are disclosed, as various embodiments of the present invention, methods and apparatus for facilitating the synthesis of compounds in a device, for example, a batch device. As an embodiment of this invention, application of the batch type devices, such as microfluidic devices, to the synthesis of radiolabeled compounds is described. These methods and apparatus enable the selective introduction of multiple reagents via an enhanced rotary flow distribution valve through a single inlet port of the synthetic device. The sequential introduction of multiple reagents through a single inlet port allows an optimal delivery of highly concentrated reagents into the reactor and facilitates the synthesis of the desired products with a minimal loss of materials during transfers, which is useful to the synthesis of biomarkers, for example radiolabeled biomarkers.

As stated above, the embodiments of the present invention are directed to a batch device. The advantages of the batch reactor lie with its versatility. A single vessel can carry out a sequence of different operations without the need to break containment. This is particularly useful when processing radiolabeled compounds. Embodiments of the present invention enable fast synthesis and increased reaction yield, which can be helpful in low yielding biomarker production. Embodiments also allow reduced loss of reagents and products, rapid chip exchange, increased reliability and increased chip operational lifetime.

This batch apparatus may be used for carrying out a multistep chemical process on a macro or micro scale. Microfluidic batch devices can be used for radiosynthesis. The synthetic systems disclosed herein comprise a microfluidic synthesis chip interfaced with a rotary valve providing an enhanced rotary distribution of incoming or outgoing materials. These systems are configured to allow the various chemical processes to be carried out, for example, reagents can be mixed and heated, solvents can be evaporated and exchanged, and the final products can be concentrated or diluted to the desired volume for elution and further processing.

A "microfluidic chip" or "synthesis chip" or "chip" or "reaction block", as used herein, is a unit or device comprising a reaction chamber and permitting the manipulation and transfer of reagents into and from the reaction chamber via channels, conduits or compartments. A microfluidic chip allows the manipulation and transfer of small amounts of liquid (e.g., microliters or nanoliters) into a reaction chamber via micro-channels and micro-compartments. The chip or microfluidic chip may be configured to allow the manipulation of liquids, including reagents and solvents, to be transferred or conveyed within the channels or micro-channels and reaction chamber using mechanical or non-mechanical pumps.

A "radiolabeled compound" is a compound where one or more of the atoms of the molecule is substituted for a radioactive isotope, such as in radioactive tracing. Radiolabeled compounds are compounds that can bind target sites in the body, including, but not limited to, for example, the brain.

The term "reactive precursor" or "precursor" refers to an organic or inorganic non-radioactive molecule that is reacted with another reagent typically by nucleophilic substitution, electrophilic substitution, or ionic exchange, to form the product. In case of a radiosynthesis, an organic or inorganic non-radioactive molecule that is reacted with a radioactive isotope, typically by nucleophilic substitution, electrophilic substitution, or ionic exchange, to form the radiopharmaceutical. The chemical nature of the reactive precursor depends on further use of the desired product, for example, physiological process to be studied.

The reactive precursor is used to produce a radiolabeled compound that selectively labels target sites in the body, including, for example, the brain, meaning the compound can be reactive with target sites in the subject and, where necessary, capable of transport across the blood-brain barrier. Exemplary organic reactive precursors include sugars, amino acids, proteins, nucleosides, nucleotides, small molecule pharmaceuticals, and derivatives thereof. For example, one precursor that may be used in the preparation of 18F-FDG is 1,3,4,6-tetra-O-acetyl-2-O-trifluoromethanesulfonyl-β-D-mannopyranose.

The term "radioactive isotope" refers to isotopes exhibiting radioactive decay (e.g., emitting positrons). Such isotopes are also referred to in the art as radioisotopes or radionuclides. Radioactive isotopes or the corresponding ions, such as the fluoride ion, are named herein using various commonly used combinations of the name or symbol of the element and its mass number and are used interchangeably (e.g., 18F, [18F], F-18, [F-18], fluorine-18). Exemplary radioactive isotopes include 124I, 18F, 11C, 13N and 15O, which have half-lives of 4.2 days, 110 minutes, 20 minutes, 10 minutes, and 2 minutes, respectively. The term FLT precursor may be used to refer to "N-dimethoxytrityl-5'-O-dimethoxytrityl-3'-O-nosyl-thymidine" (also known as "BOC-BOC-Nosyl").

The term "target water" is [18O]H2O after bombardment with high-energy protons in a particle accelerator, such as a cyclotron. Target water contains [18F]fluoride. Preparation of target water may be performed separately from the system disclosed herein. Alternatively, target water may be supplied to the system from a cartridge; or from a pre-filled individual vial.

The term "column" means a device that may be used to separate, purify or concentrate reactants or products. Such columns include, but are not limited to, ion exchange and affinity chromatography columns.

A "flow channel" or "channel" means a channel or microfluidic channel through which a fluid, solution, or gas or combination of fluid, solution and/or gas may flow. It is also a channel through which vacuum can be applied. For example, microfluidic channels may have a cross section of about 0.1 mm to about 1 mm.

The term "reactor" or "microreactor" refers to a system or microsystem for conducting chemical and biochemical reactions, including various types of fluid handling.

The term "reaction chamber" refers to a chamber or a core within the reactor where the reactions may take place. The reaction chamber may, for example, be cylindrical in shape. The microfluidic reaction chamber may have one or more micro-channels connected to it that deliver reagents and/or solvents or are designed for product removal (e.g., controlled by on-chip valves, or equivalent devices). For example, the reaction chamber may have a diameter to height ratio of greater than about 0.5 to about 10, or more. By the way of example, and not by limitation, the microfluidic reaction chamber height may be about 25 micrometer (µm) to about 20,000 micrometers (µm). Typically the small reaction volumes and high heat and mass transfer rates allow for precise adjustment of process conditions, short response times, and defined residence times, resulting in greater process control and higher yields and selectivity.

The term "evaporation" refers to the change in state of solvent from liquid to gas that is usually followed by removal of that gas from the reactor. One method for removing gas is effected by applying a vacuum. Various solvents are evaporated during the synthetic route disclosed herein, such as for example acetonitrile and water. Each solvent, such as acetonitrile and water, may have a different evaporation time and/or temperature.

The term "elution" generally refers to removal of a compound or a reaction mixture from a particular location, for example, the reaction chamber or reactor by means of a solvent. Elution of product from the reaction chamber refers to conveyance of the product from the reaction chamber to the off-chip product vial (or into the purification system) by, for example, flushing the reaction chamber with a volume of solvent, e.g. water. Elution of [18F]fluoride from the ion exchange column refers to the conveyance of [18F]fluoride by the eluting solution from the column to the reaction chamber.

The term "liquid" generally refers to a homogeneous or a heterogeneous fluid. Solution is an example of a homogeneous fluid. Heterogeneous fluid such as, for example, a suspension or slurry, contains solid particles, for example, insoluble reagents or products, or beads (reagents on solid support). Heterogeneous fluids also include emulsions or colloids.

The term "rotary valve" refers to a type of valve in which the rotation of a passage or passages in a transverse plug regulates the flow of liquid or gas through the attached pipes. The rotary valve may include a stationary part or a stator and a rotating part or a rotor. In industry, a rotary valve (which can also be called airlock or a stopcock) is often used to enter or extract material from two chambers or compartments or channels with different pressure levels. As part of the material exchange process, the valve may be used as a measuring or metering device.

Embodiments of the present invention include, for example a microfluidic device, which may be constructed using micro-electromechanical fabrication. Alternatively, the devices can be machined using computer numerical control (CNC) techniques. Examples of substrates for forming the device include glass, quartz, silicon, ceramics or polymer. Such polymers may include PMMA (polymethylmethacrylate), PC (polycarbonate), PDMS (polydimethylsiloxane), DCPD (polydicyclopentadiene), PEEK and the like. Such device may further comprise columns, pumps, mixers, valves and the like.

Some examples of advantages of the device, or apparatus, of embodiments of the present invention include precise manipulation of highly concentrated reagents, high surface-to-volume ratios, precise control over mass and heat transfer, fast synthesis and high yields of radiolabeled products.

The microfluidic batch device is a suitable choice for radiosynthesis because radiosynthesis involves nanogram amounts of isotope and requires precise handling and elimination of product loss via transfers. If the latter is manipulated in any significant volume of solvent, it leads to low concentration and therefore low reaction rate. Meanwhile if it is handled in high concentration (and therefore low volume) most of the isotope can be lost on its way to the microreactor. To claim the benefits of both, one would need to bring the concentrated solution of isotope into the reaction chamber with the minimal loss of the isotope and carry out the reaction in low volume/high concentration.

Microfluidic batch devices with an "on-chip" rotary valve for selective and precise delivery of reagents allows such manipulations.

The batch devices may also contain multiple reactors with different volumes or features suited for the different steps of a process, where multiple reactors are connected in a number of ways including, but not limited to sequential, parallel, splitting into multiple paths for creating libraries, or a network. These devices can be interfaced with additional rotary valves.

The microfluidic batch devices, as described herein, are capable of processing small quantities of molecular probes, as well as expediting chemical processing thereby reducing the overall processing or cycle times, which simplifies the chemical procedures, and also providing the flexibility to produce a wide range of probes, biomarkers and labeled drugs or drug analogs, inexpensively.

The batch devices, as described herein, may be used in research and development environments, facilitating the testing and development of new compounds and probes. For example, co-pending U.S. patent application Ser. No. 12/102, 822, the contents of each of which are hereby incorporated in their entirety by reference, provide descriptive material related to microfluidic devices.

In one embodiment, the synthetic systems disclosed herein comprise a microfluidic reaction chamber in which, for example, reagents are concentrated, mixed and heated, and solvents are evaporated and exchanged to carry out the desired chemical process.

In accordance with the various embodiments of the present invention, the batch apparatus allows optimal delivery and removal of the highly concentrated precursors and reaction products into and from the reaction chamber through the precise alignment of the rotary valves, wherein each of the said rotary valves comprises a mechanically sealed system of a stator and a rotor, with the reactor. Additionally, a reactor having a singe inlet and a single outlet, a feature that is especially beneficial for the microfluidic reactor of the present invention.

In another embodiment the evaporation takes place by heating the reaction chamber while flowing an inert gas over the reaction mixture to effect the removal of vapors from the reaction chambers.

FIG. 1 depicts a device, or apparatus, 10 according to an embodiment of the present invention. As illustrated in FIG. 1, a reaction block or chip 102 containing a reaction chamber (not shown in FIG. 1, shown in FIG. 2 as element 234), comprises a reactor 136, a lid 104 and a lid cover, or lid spacer 142. Reactor 136 has a single inlet port (not shown) and a single outlet port 114. The device 10 also includes a rotary valve ("on-chip rotary valve"), comprising a stator 140 and a rotor 150. The chip 102 and a rotary valve may be fabricated as a single unit. The device 10 further includes support members, also referred to as spacers or rotor housings, 108, 110, 118, 120 and 128. The components of FIG. 1 are described in more detail below. The chip 102 may be configured to be compressed and/or sealed between two reagent distribution members or a reagent distribution member and a hard stop. The use of the hard stop allows creation of a high pressure seal. The reagent distribution member may be a rotary valve and/or a stator and/or a rotor. The chip 102 may be configured with no on-chip moving parts but with controlled flow in/out of the reactor or reaction chamber. The chip may be configured as "a single-piece chip" as well as a "non-elastomer chip". Such synthetic chips, as exemplified by the chip 102 and described above, can be easily replaced and interchanged with each other within the device of the present invention. Such features of the chip as the simplicity of construction, the ease replacement and interchange with other types of chips as described above allow easy scalability of various chemical protocols and are of great value to research and production applications.

As shown in FIG. 1, the chip 102 is disposed between support member (spacer) 118 and the stator 140. The chip, or reaction block, 102 is typically fabricated from glass or ceramic material, or other material such that it provides a suitable housing to contain chemical reactions that can be carried out at elevated temperatures and pressure.

The lid 104 is affixed to the reactor 136 using screws, or epoxy, or resin, or bolts or other suitable adhering means to attach the lid 104 to the reactor 136. The led 104 may be press-fit to the reactor 136. The lid 104 is configured to have inlet/outlet ports to allow delivery or removal of a gas or a liquid or a mixture of gas and/or liquid to the reaction chamber (not shown in FIG. 1; but shown in FIG. 2 as element 234). These inlet/outlet ports are shown as, for example, port 116 and port 122. Also shown is outlet port 114, which is disposed on support, or spacer member 118. The outlet port 114 is used to remove gas or fluid or a mixture thereof from the reaction chamber. The lid 104 is described in more detail in relation to FIG. 3.

While two lid ports (116, 122) are shown in FIG. 1, it is also an embodiment of the present invention to utilize more than two inlet/outlet ports on the lid 104. Furthermore, any number of ports that are compatible with the device 10 may be used. For purposes of this description, two lid ports (116, 122) will be used for explanation.

Each of the lid ports (116, 122) is suited to function as an inlet port to provide gas or liquid and/or mixtures thereof, to the reaction chamber. Alternatively each of the ports (116, 122) is also suited to function as an outlet port to remove gas or liquid and/or mixtures thereof, from the reaction chamber.

Thus, the lid ports (116, 122) may be used as either inlet or outlet ports provided one of the lid ports is an outlet.

As shown in FIG. 1, lid ports 116 and 122 are connected to channel 124 and 126, respectively (i.e., lid port 116 is coupled to channel 124 and lid port 122 is coupled to channel 126. Channels, also referred to as conduits, 124 and 126 serve as a conduit to the reaction chamber, thereby providing a path for gas and/or fluid or a mixture thereof to travel. Typically, vapor and/or pressurized gas and/or a vacuum use channels 124, 126. It is an embodiment that additional ports may be coupled to other conduits leading to the reaction chamber, or other ports may couple to a conduit, or channel, such as 124 or 126.

Generally, the microfluidic channels or tubes, or flow channels, (sometimes referred to as micro-channels or capillaries or conduits) have at least one cross-sectional dimension (e.g., height, width, depth, diameter), which by the way of example, and not by limitation, may have, for example, a cross section dimension in the range of about 0.05 microns (μm) to about 1,000 microns (μm). The particular shape and size of the flow channels depend on the particular application required for the reaction process, including the desired throughput, and may be configured and sized according to the desired application.

The micro-channels permit manipulation of extremely small volumes of liquid, for example on the order of about 1 nL to about 1 μL.

The microreactors, or reaction chamber may also comprise one or more reservoirs in fluid communication with one or more of the micro-channels, each reservoir having, for example, a volume of about 5 μL to about 1,000 μL.

The stator of the rotary valve 140 is disposed between the chip 102 and support member (spacer) 110. The stator 140 has a plurality of fluid line or tubing (not shown) attachments such as, for example, nuts or fittings, 106(a) . . . (n), where "n" is any suitable number. A support member 110 is disposed in close proximity to the stator 140. The support member 110 has a cavity that supports the rotor 150. The rotor 150 is connected with a shaft 112 that is supported by a support member (spacer or rotor housing) 108. The shaft 112 is further connected to a servo-motor (not shown). The stator 140 is described in more detail in relation to FIG. 4. The rotor 150 is described in more detail in relation to FIG. 5.

Support members 108, 110, 118, 120 and 128 are used to support and/or contain elements of device 10. For example, as stated previously, support member (rotor housing) 108 supports rotor 150 and has a cavity for housing the circular portion of shaft 112. Support member 108 has holes, or vias, to be affixed, for example, by screws (not shown) to support member 110.

Support member 110 has a cavity for housing rotor 150. Support member 110 is disposed so that rotor 150 is connected with the stator 140 via solid-solid contact and mechanical sealing.

Support member 118 is used to support lid ports 116 and 122, which are connected to conduits 124 and 126, respectively and the chamber (or reaction chamber or reactor or chip) outlet port 114.

Support members or spacers 120 and 128 provide housing to the outlet rotary valves 132(a) and 132(b) (a third outlet rotary valve is not visible in FIG. 1) and have cavities for housing the circular portions of corresponding shafts 130(a) . . . (c). While two outlet rotary valves 132 (a) and (b) are shown, it is also an embodiment of the present invention that any suitable number of rotary valves, generally 132, may be used. Similarly, any suitable number of shafts, generally 130, may also be used.

Support member 120 has holes, or vias, to be affixed, for example, by screws (not shown) to support member 128.

Shafts 130(a) . . . (c) are connected to corresponding pneumatic rotary actuators (not shown).

As stated previously, an embodiment of the present invention is directed toward the apparatus described above, wherein multiple reactors are connected in a variable configuration. The configuration includes sequential, parallel, splitting into multiple paths for creating libraries, or network.

Figure 2:
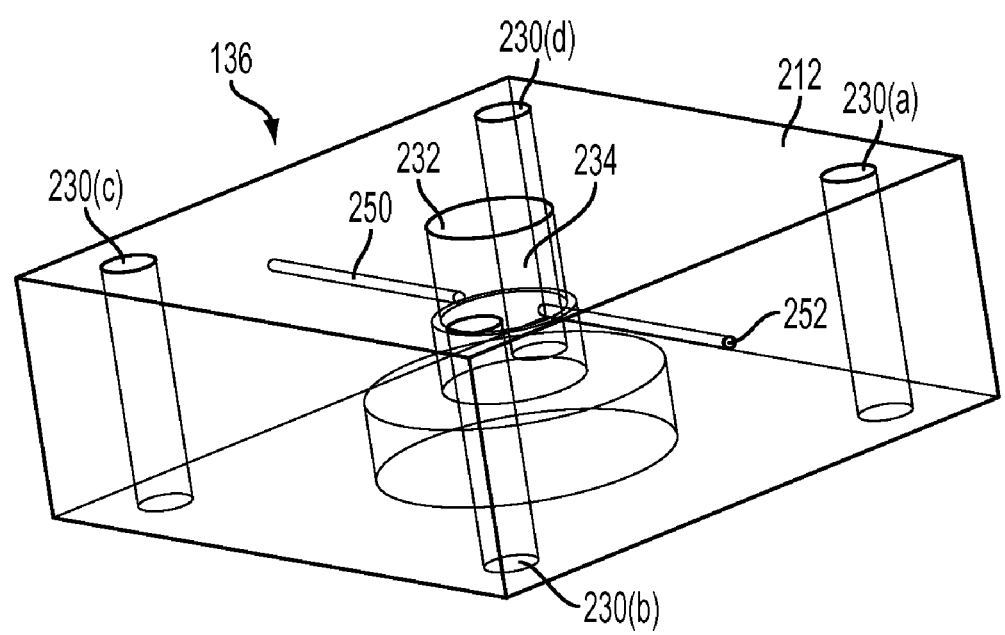
FIG. 2 illustrates a reactor in accordance with an embodiment of the present invention.

FIG. 2 depicts the reactor 136 according to an embodiment of the present invention. As illustrated in FIG. 2, the reactor 136 contains a reaction chamber 234, which has a chamber inlet port 250 and a chamber outlet port 252. The reaction chamber 234 may be cylindrical in shape. The reaction chamber inlet port 250 may be fluidly connected to the inlet fittings (shown in FIG. 1 as elements 106(a) . . . (n)). The reaction chamber outlet port 252 may be fluidly connected with the outlet port (shown in FIG. 1 as element 114). The reaction chamber 234 typically has a volume suitable for performing or containing chemical reactions. A reaction chamber opening 232 interfaces with a reaction chamber lid (shown as element 332 on FIG. 3). A reactor surface 212 is interfaced with a corresponding lid surface (element 312 of FIG. 3). Also shown in FIG. 2 are holes, or vias 230(a) . . . (d) that are used to connect the components of device 10, as shown in FIG. 1.

A chemical reaction may be is effected within the reaction chamber, a liquid within the reaction chamber may be evaporated, the reaction chamber may be configured with a separation or chromatographic system to allow purification of the desired product by high-performance liquid chromatography (HPLC), the chemical process may include concentrating one or more incoming reagents, the chemical process may include mixing of reagents, the chemical process may include_evaporation of one or more solvents, the chemical process may include exchange of one or more solvents, the process may include concentrating at least one reaction product.

Another embodiment of the present invention is directed toward the apparatus described above, wherein the chemical process steps are affected by controlling temperature, pressure and a flow rate of an incoming gas.

Figure 3:
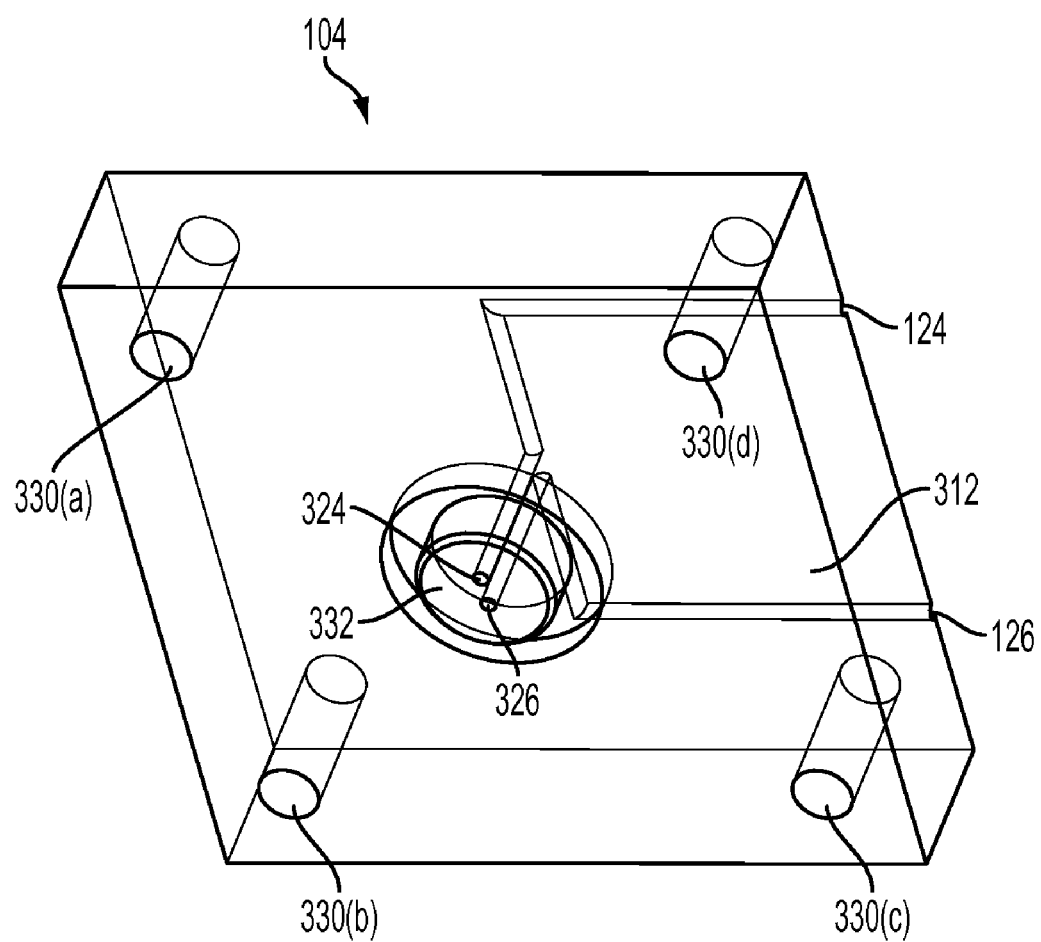
FIG. 3 illustrates a lid in accordance with an embodiment of the present invention.

FIG. 3 depicts the lid 104 according to an embodiment of the present invention. As illustrated in FIG. 3, the lid 104 is configured to have channels, or tunnels, or conduits, or paths, 124 and 126 to allow delivery or removal of a gas or a liquid or a mixture thereof to and from the reaction chamber (shown in FIG. 2 as element 234). These inlet/outlet channels are connected to the corresponding openings 324 and 326 in the reaction chamber lid 332, which is used to secure the lid 104 to the reactor and thus the reaction chamber. (Reactor shown in FIG. 2 as element 136 and reaction chamber is shown in FIG. 2, as element 234). It is an embodiment that additional ports may be coupled to other conduits leading to other reaction chamber lid openings (324, 326), or coupled to a conduit connected to a port, such as 124 or 126, as shown in FIG. 1.

As described above, FIG. 3 depicts lid 104 having a reaction chamber lid portion 332, which is, for example, a circular center portion that supports ports 324 and 326. As described herein, ports 324 and 326 may serve, for example, as inlet or outlet ports for gases or vapors, entering or exiting the reaction chamber. While reaction chamber lid portion 332 is shown as a circular center member, any suitable design geometry may be used to provide the support function and interface function to secure the reaction chamber lid to the reactor (FIG. 1, element 136) and hence the reactor chamber (FIG. 2, element 234). Holes 330(a) . . . (d) provide a connection mechanism to connect portions of the device (shown in Fig. as element 10). As stated in relation to FIG. 2, lid surface 312 interfaces with reactor surface (reactor surface shown as element 212 of FIG. 2).

Figure 4:
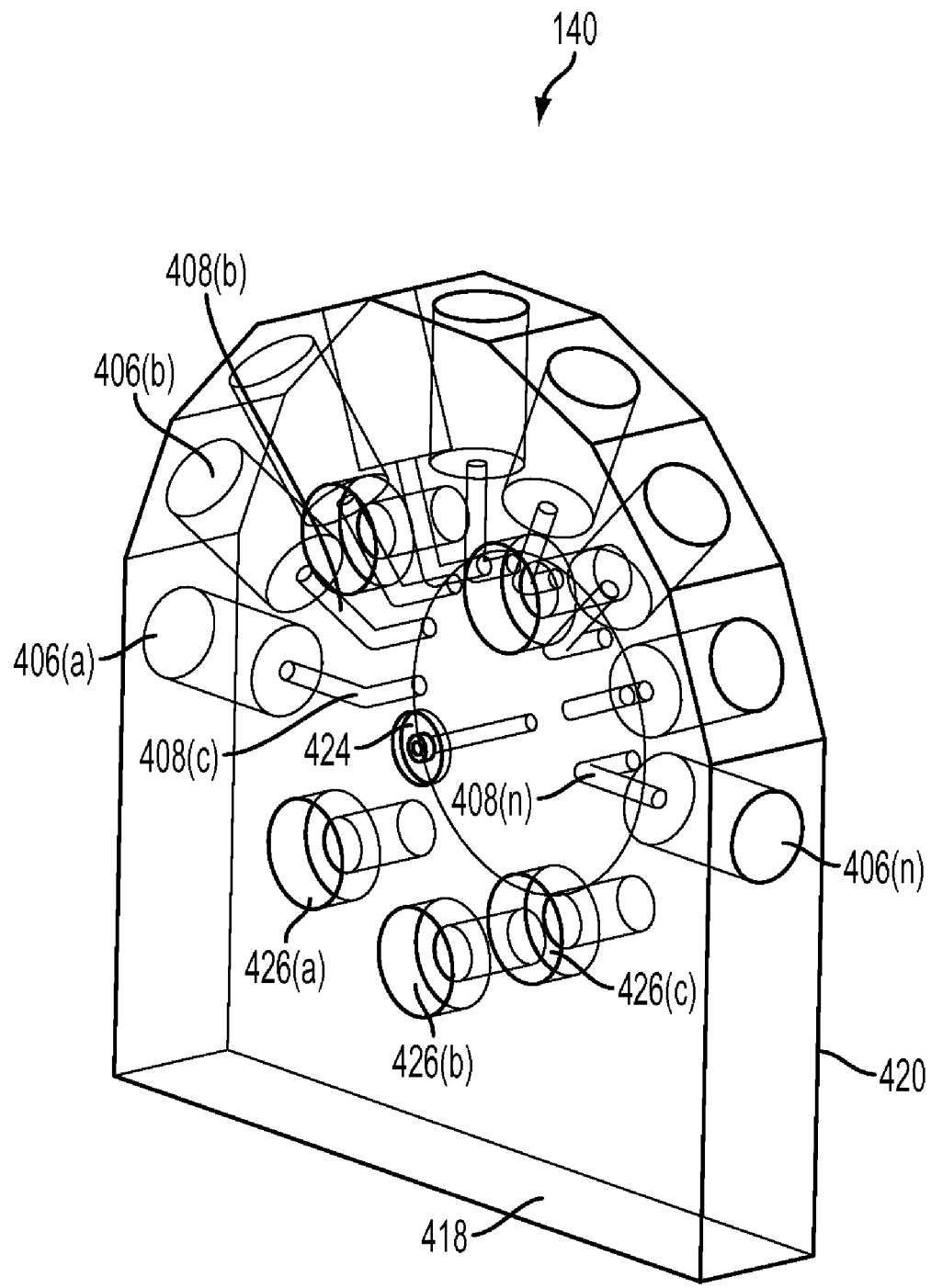
FIG. 4 illustrates a stator of a rotor valve in accordance with an embodiment of the present invention.

FIG. 4 shows the stator of the rotary valve, 140. As illustrated in FIG. 4, the stator 140 has a plurality of connectors 406(a) . . . (n), where "n" is any suitable number, (generally 406) associated with a plurality of flow channels or passages 408(a) . . . (n), where "n" is any suitable number (generally 408). Each connector 406 is coupled with a corresponding fitting or nut 106 (fittings 106(a) . . . (n) are shown in FIG. 1). Each flow channel 408 can be aligned with a center port 424 of the stator via a channel cut or etched onto the polished surface of the rotor 150 (shown_as element 552 in detail in FIG. 5) to allow the passage of a desired reagent(s) into or from the fluid lines or tubes (not shown) connected via fittings 106 to the stator of the rotary valve. Openings 426 (a) . . . (c) are mechanical orifices. Stator surface 418 comes into contact with the chip (not shown in FIG. 4) and stator surface 420 has an interface with the rotor 150 (shown in FIG. 5).

As shown in FIG. 4, for example, the flow channels, or passages, or microfluidic channels or tubes (sometimes referred to as micro-channels or capillaries or conduits) 408 have at least one cross-sectional dimension (e.g., height, width, depth, diameter), in the range of about 0.05 microns (μm) to about 1,000 microns (μm). The particular shape and size of the flow channels 408 depend on the particular application required for the reaction process, including the desired throughput, and may be configured and sized according to the desired application. The flow channels or passages 408 provide a conduit or path for delivery of fluid and/or gas or a mixture thereof to the reactor (not shown in FIG. 4). While channels 408 may deliver and/or remove fluid or gas or a mixture thereof, channel 408 is also a channel through which vacuum can be applied.

The center port 424 is configured to be connected to either one of the ports of the reaction chamber, 250 or 252 (FIG. 2), via a mechanical seal which may utilize, for example an o-ring, or elastomer face seal, or mechanical non-elastomeric face seal, or other suitable sealing mechanism to allow the passage of reagents from the fluid lines of the stator 140 in to the reaction chamber 234 (FIG. 2).

Figure 5:
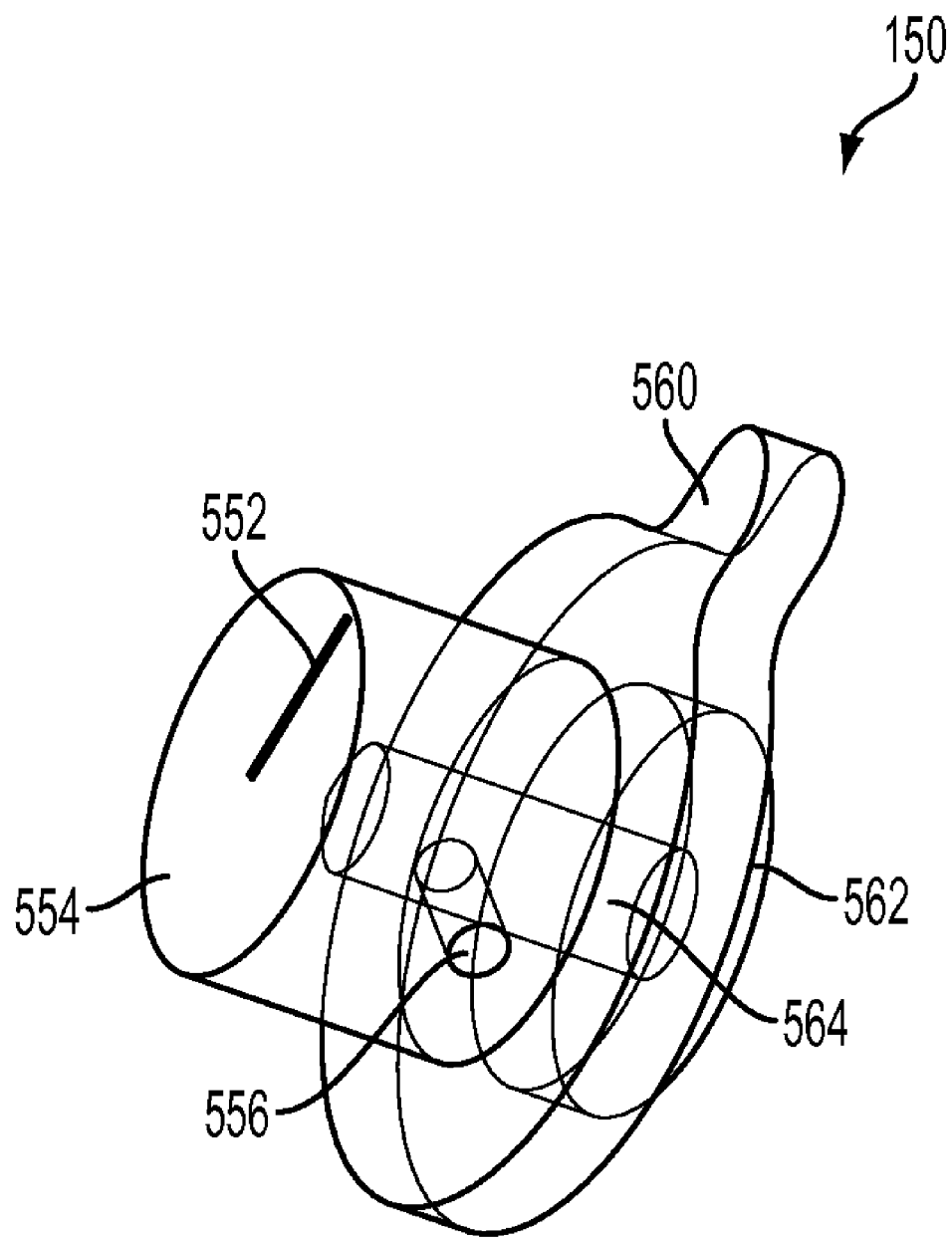
FIG. 5 illustrates a rotor of a rotary valve in accordance with an embodiment of the present invention.

FIG. 5 depicts the valve rotor 150, which has a channel 552 cut or etched onto its polished surface 554. When the rotor 150 is rotated against the stationary stator (shown as element 140 in FIGS. 1 and 4), the channel 552 on the polished surface 554 connects the flow channels (FIG. 4, element 408) of the stator (FIG. 1, element 140) with the center port of the stator (FIG. 4, element 424) and therefore allows, for example, delivery of the selected reagents from the appropriate fluid lines via associated fitting (fittings shown in FIG. 1 as element 106) into the reaction chamber (FIG. 1, element 234). When the channel or passage 552 is not aligned with the flow channel, (FIG. 4, element 408) the inlet or outlet port (FIG. 1, elements 116, 122) of the reaction chamber (FIG. 2, element 234) is sealed. The rotor 150 contains a housing cavity 564 for the shaft (shown in FIG. 1 as element 112). Shaft (112) can be secured inside the cavity by using the screw opening 556. A flange member 560 is used to facilitate mounting the rotor 150 to a support member. Surface 562 facilitates placement of rotor 150 relative to support member 108, as shown in FIG. 1. Also, surface 554 facilitates placement of rotor 150 relative to support member 118, as shown in FIG. 1.

Figure 6:
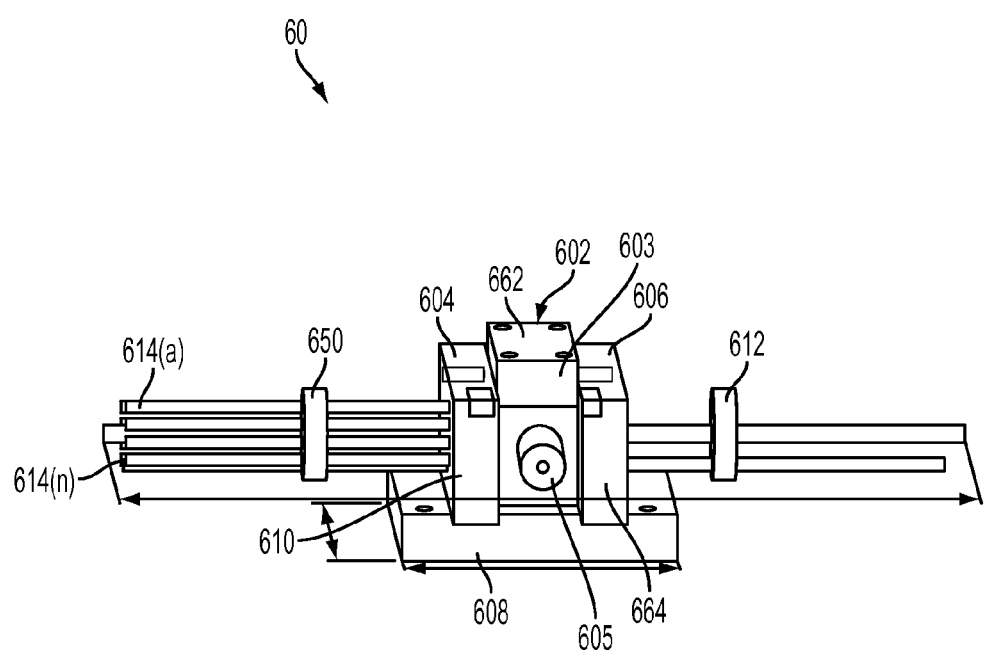
FIG. 6 illustrates a device in accordance with an embodiment of the present invention.

FIG. 6 depicts device 60 according to one of the embodiment of the present invention. The device 60 comprises a chip 602, comprising a reactor 605 and a lid 603, and supported by spacers or support members 604 and 606, and a base 608. The device 60 further comprises an inlet rotary valve 610 and an outlet valve 612 configured to have a movable interface with the chip 602. A reaction chamber (shown in FIG. 7 as element 706) is situated inside the chip 602, which comprises a reactor 605 and a lid 603 shown in more detail in FIGS. 7 and 8, respectively. The rotary valve 610 is configured to allow, for example, the selective delivery of the appropriate reagents to the chip/reaction chamber through fluid lines 614 (a) . . . (n), where "n" is any suitable number, by rotating the valve and selectively aligning the appropriate fluid line with an inlet port of the chip/reaction chamber. A circular support member 650 may be used for inlet tubes or any fluid lines 614 (a) . . . (n). Lid inlet port 662 and lid outlet port 664, may be utilized, for example, for delivery and/or removal of gases or vapors.

Figure 7:
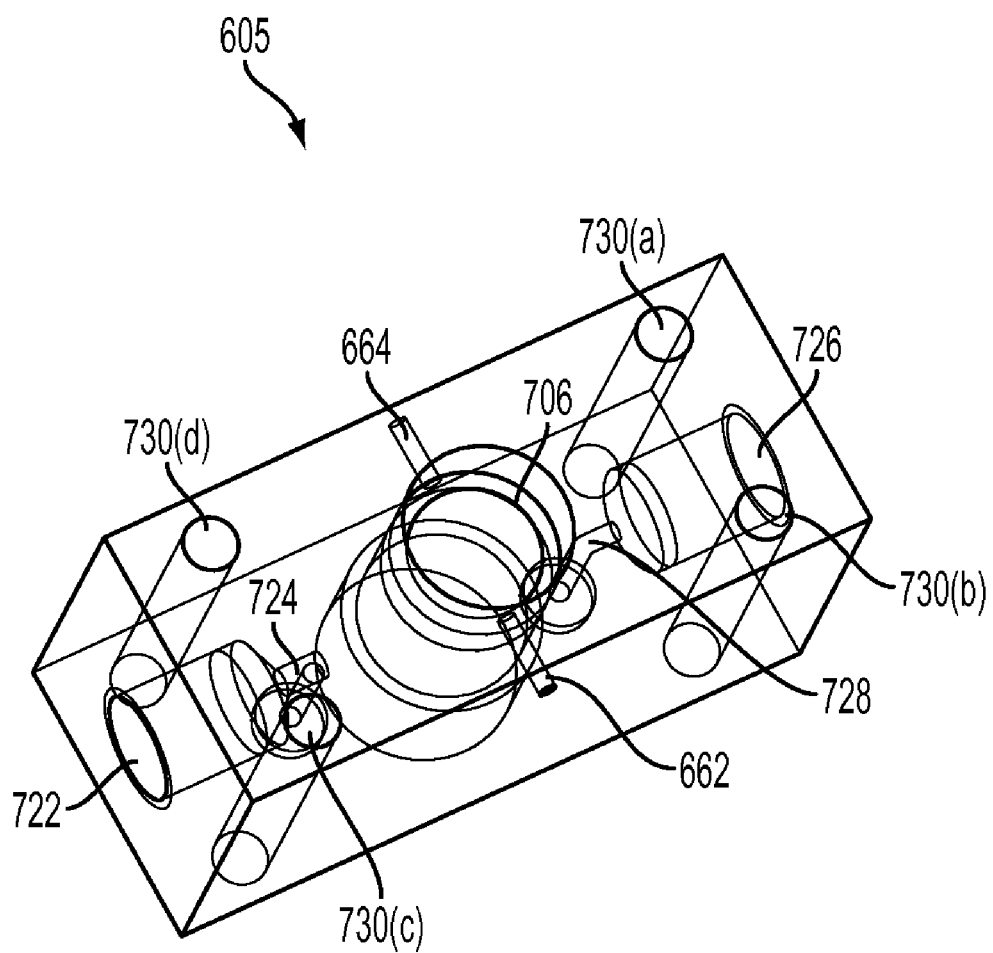
FIG. 7 illustrates a reactor in accordance with an embodiment of the present invention.

FIG. 7 depicts the reactor 605 according to an embodiment of the present invention. As illustrated in FIG. 7, the reactor 605 contains a reaction chamber 706, which has one chamber inlet port 662 and one chamber outlet port 664. The designation of "inlet" and "outlet" is merely for description purposes. Indeed port 662 may be used as an outlet port and port 664 may be used as an inlet port. As illustrated in FIG. 7, the reactor 605 also comprises mechanical connectors 722 and 726 supported by the corresponding arms 724 and 728, and screw openings 730 (a)-(d) for adjusting the position of the reactor within the device as described herein.

Figure 8:
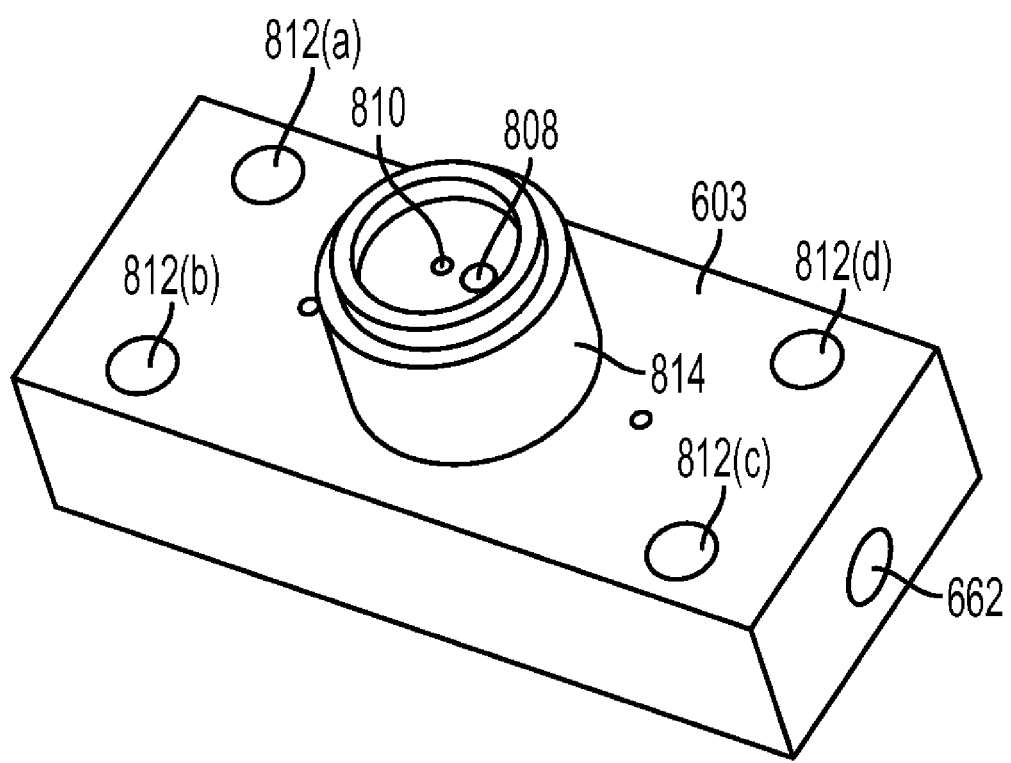
FIG. 8 illustrates a lid in accordance with an embodiment of the present invention.

FIG. 8 depicts the lid 603 according to an embodiment of the present invention. As illustrated in FIG. 8, the lid 603 is configured to have inlet/outlet ports (port 662 is shown in FIG. 8, port 664 is shown in FIG. 7) to allow delivery or removal of a gas or a liquid or a mixture thereof to and from the reaction chamber (FIG. 7, element 605). These inlet/outlet ports (662, 664) are connected via fluid channels or conduits with the corresponding openings 808 and 810 in the reaction chamber lid 814. It is an embodiment that additional ports may be coupled to other conduits leading to other reaction chamber lid openings 808, 810, or coupled to a conduit connected to a port, such as 662 or 664 (port 664 not shown in FIG. 8). As illustrated in FIG. 8, elements 812 (a) . . . (d) represent screw openings that may be used to connect the lid 603 to other components of the device 60 (shown in FIG. 6).

Figure 9:
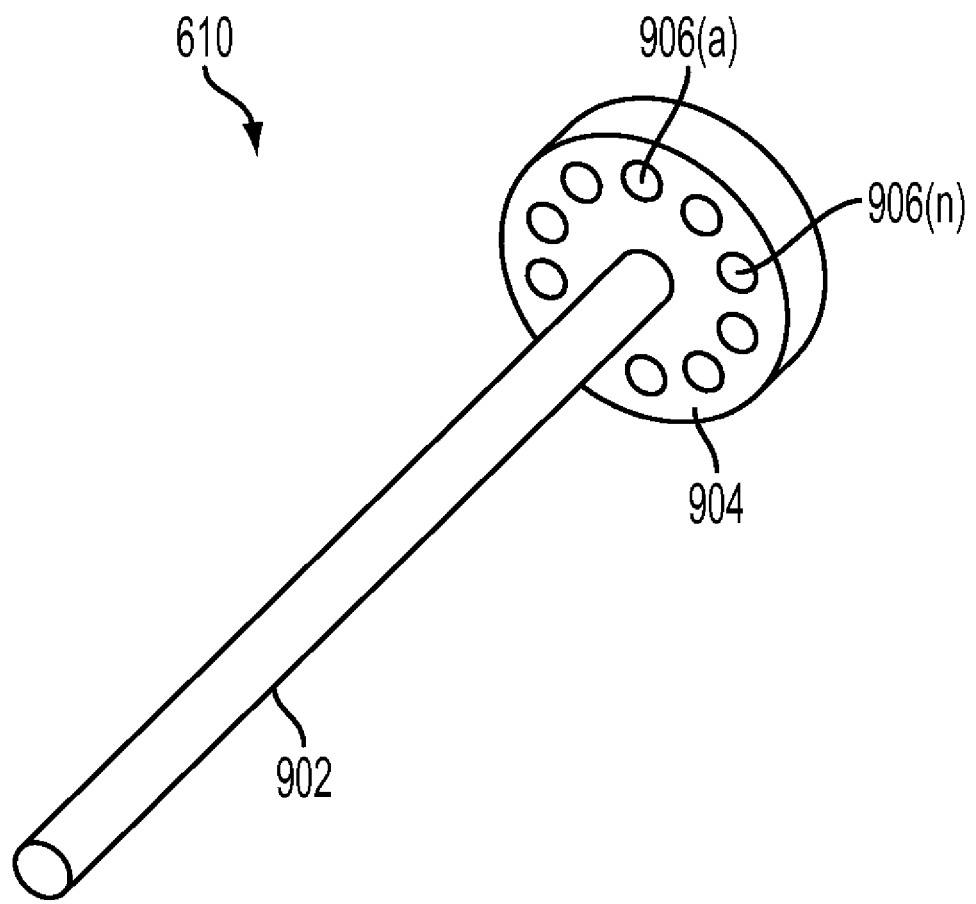
FIG. 9 illustrates a rotary valve in accordance with an embodiment of the present invention.

FIG. 9 shows an inlet rotary valve 610 having a shaft 902 and a disk 904 with openings 906(a) . . . (n), where "n" is any suitable number, for a plurality of fluid lines or tubes (shown in FIG. 6 as elements 614(a) . . . (n)).

The reagent delivery in accordance with embodiments of the present invention may be enabled by rotary valves interfaced with the reactor by a special design that may not rely on an elastomer face seal or an o-ring and can withstand much higher pressures than previous systems.

Devices produced in accordance with example embodiments of the present invention allow higher pressure rating up to 1000 psi to be reached inside the reaction chamber.

As an example, it has been demonstrated that one embodiment of FLT radiosynthesis is possible when all reagents are delivered to the cylindrical reactor through the same port. An external rotary valve has been used and a 6 port reactor with extra ports closed. The next step is creation of a rotary interface between the chip and the rotor. This has also been done in a concept device. It has been demonstrated that it is possible to either align or close the ports and hold pressure in both positions.

Various additional and alternate embodiments that are all within the scope of the present invention will now be described. Reference to FIGS. 1-9 will be made by identifying examples of component elements in parenthesis for reference. Indeed, the synthesis chip (102, 602) of the present invention is interfaced with a rotary valve (for example 610, or rotary valve including stator 140 and rotor 150) providing an enhanced rotary distribution in such a way as to allow an optimal supply of the reagents, accuracy of the process and simplicity of the peripheral instrumentation.

It is a further embodiment of the present invention, that the device (FIG. 1, apparatus 10, FIG. 6, apparatus 60) is designed to provide an apparatus and a method using rotary flow distribution mechanisms for accurate reagent distribution. As demonstrated in FIG. 5, the rotor (150) has a very small channel 552 cut or etched onto its polished surface 554. Each of the inlet lines can be fluidly connected with the chip inlet port via the rotary valve. The seal between the inlet port and rotary valve may be for example, a mechanical seal which may or may not require an o-ring or elastomer face seal.

In one of the embodiments of the present invention, the seal between the inlet port and the rotary valve does not require an o-ring or elastomer face seal.

One or more chip outlet ports may be used for the vent, the pressurizing gas inlet and the reaction chamber elution port. Each if these can be turned on or off individually by small pneumatic rotary actuators (not shown). The pneumatic rotary actuators will align the port with its appropriate line or seal the port via the valve rotor which has a very small channel (552) cut or etched onto its polished surface (554).

As illustrated in FIGS. 1, 2 and 3, where FIGS. 2 and 3 represent the chip components, the simplified chip is easy and inexpensive to produce as well as very easy to replace in an automated synthesis instrument or system.

Additionally, utilization of such a rotary distribution system as exemplified in FIGS. 1, 4, and 5 and described herein, simplifies the fabrication of the chip and facilitates assembly and adjustment of the reactor unit as plunger valves and ports previously machined in the reactor body may be eliminated. This simplification allows the choice of more favorable material such as glass and ceramic that will require fewer machining steps and have better optical or mechanical advantages.

In another embodiment of the present invention, shown in relation to FIGS. 6-9, the device design is based on an on-chip liquid distribution system integrated with the body of the reactor. In this design, two rotary disks illustrated in FIG. 6 are interfaced with two sides of the reactor via solid-solid contact and mechanical sealing. To achieve required mechanical seal, surfaces will be lapped and polished to an adequate smoothness level via surface lapping and polishing procedures. Rotation of the rotary disks via a stepper motor manipulation system enables multi stage rotation and sequential introduction of different reagents to the reactor or discharge of the product out of the chip on the opposite side of the reactor (see FIG. 7). This eliminates the need of multiple plunger units used in previous chip generations and minimizes the total dead volume of liquid transferred to the chip.

In another embodiment of the present invention the device includes on-chip integrated rotary valves that selectively control the flow of gas or liquid, or a mixture thereof.

In another embodiment, the on-chip rotary valves control the delivery of appropriate reagents into the reaction chamber and removal or elution of the reaction products.

Integrating the multi-line rotary valves on-chip, allows better sealing of the reactor as well as better pressure control. It also prevents solvent and reagent loss into extended off-chip vent tubing. Accordingly, the rotary valves may come right up to the ports of the reaction chamber, eliminating the channels between the distribution valves and the reaction chamber, and thus allowing a closed system with no plumbing extensions and multiple plunger units. This enhances accurate reagent distribution into the reactor and minimizes the total dead volume of liquid transferred to the chip.

In one embodiment, the gas or vapor removal takes place by flowing nitrogen over the top of the liquid. This flow can be effected in a controlled fashion, thus determining the rate of evaporation or allowing complete blockage during the reaction steps.

In yet another embodiment, either the gas or the liquids may be pulled into the reaction chamber by applying a vacuum to an outlet/lid port, thus producing the negative pressure necessary for introducing the gas and/or liquids into the chamber.

In one embodiment of the present invention, the temperature may be maintained by heating the pressurized gas prior to its entry to the reaction chamber and/or by a heating device that is configured to heat the reaction chamber or a bottom part of it. An external heating element may be used. The reaction chamber may be sealed and pressurized.

Additionally, the reactor may incorporate a built-in sonic equipment onto the chip to facilitate reactions by rapid mixing of reagents. In another variation a surface acoustic wave is used to facilitate mixing in the reaction chamber. In yet another embodiment, capillary channels that can aspirate the liquid and release it back into the reaction chamber in a form of a jet are used to mix the reagents.

In order to remove the deposited solvent or residue, the gas flow may be applied and a solvent that may be the same or a different solvent may be introduced to sweep or dissolve the residue from the reaction chamber, which may then be conveyed, for example, into a vial. The above-described steps may be carried out in an automated manner, and repeated as many times as desired.

The specific configuration of liquid inlet ports and rotary valves of provides a suitable example for illustrating the underlying concepts of the microfluidic batch apparatus of the present invention for carrying out a multistep chemical process.

The chip allows reagents on solid supports (e.g., by placing beads in the reactor that can remain in the reactor while solutions enter and exit).

The above-described batch apparatus may be used in a microfluidic system to efficiently perform the desired chemical reactions by precisely controlling the introduction and removal of reagents into and out of the reaction chamber (shown in FIG. 2 as element 234). Typically, reactions in microfluidic batch reactors proceed in 1-1000 sec at temperatures of about −78° C. to about 400° C. and pressures of about 0 to 50 psi. The flow rate of the carrier gas, such as nitrogen, is from about 0 to 10 scfm (standard cubic feet per minute).

In one example embodiment, a device/instrument combo is provided that enables the performance of multiple reactions at the same time. In such a configuration, several batches may combine product at purification stage. Alternately, several batches may be staggered to allow sequential runs of the purifications on the same column with reaction mixtures originating from different reactors.

In one embodiment, switching between a positive and a negative gas pressure allows the user to alternate between the reaction and the evaporation modes of operation. Additionally, or alternatively, a vacuum (not shown) may be applied to effect the conveyance of gas and/or liquids into the reaction chamber, which may be combined with an application of a vacuum to an outlet to maintain and/or facilitate the mixing and/or evaporation of the mixture.

In addition, the methods and devices in accordance with the various embodiments of the present invention may provide the following additional features and benefits:

These and other advantages associated with the use of the batch apparatus are demonstrated by referring to the previously-described exemplary steps associated with the system of FIG. 1. The following examples demonstrate the application of the batch apparatus to the various steps associated with the synthesis of a radiolabeled compound in accordance with the various embodiments of the present invention.

Using the batch apparatus in accordance with the various embodiments of the present invention, allows reagents to be selectively delivered with minimal material loss into the reaction chamber to undergo the desired chemical process. Introduction of the reagents and solvents via a single inlet as well as removal of products via a single out let by using stationary and movable rotary valves facilitates the synthesis of radiolabeled compounds in a microreactor and improves the yield of the radiolabeled product.

These and other features of the apparatus allow the synthesis of a larger range of radiolabeled compounds using a microfluidic system.

In another embodiment, the system comprises one or more reactors connected in a number of ways, which include, but are not limited to sequential, parallel, splitting into multiple paths for creating libraries (where paths split and reconnect), or network and having the capability to simultaneously vary one or more of the process conditions, which include, but are not limited to flow rates, pressure, temperature and feed composition.

In another embodiment, the nonflow-through apparatus is scalable. The batch apparatus may be made and used in volume ranges from about 5 µL to about 10,000 L.

More specifically, the volumes of reactions performed with the apparatus may be increased from initial volumes by increasing the dimensions of the device; but the results of the reactions using the higher volumes are proportional to the results of the initial volumes. Thus, the results of small volume reactions, for example from about 5 µL to about 500 µL apply to reactions performed using higher volumes for example from about 5 mL to 10,000 L.

Generally, embodiments of the present invention are directed to systems methods and apparatus for synthesis of radiolabeled compounds and to improve efficiency of radiosynthesis using microfluidic devices.

Some examples of the radiolabeled compounds that may be prepared according to one or more embodiments of the present invention include compounds selected from the group of 2-deoxy-2-[18F]fluoro-D-glucose ([18F]FDG), 6-[18F]fluoro-L-3,4-dihydroxyphenylalanine ([18F]FDOPA), 6-[18F]fluoro-L-meta-tyrosine ([18F]FMT), 9-[4-[18F]fluoro-3-(hydroxymethyl)butyl]guanine ([18F]FHBG), 9-[(3-[18F]fluoro-1-hydroxy-2-propoxy)methyl]guanine ([18F]FHPG), 3-(2'-[18F]fluoroethyl)spiperone ([18F]FESP), 3'-deoxy-3-[18F]fluorothymidine ([18F]FLT), 4-[18F]fluoro-N-[2-[1-(2-methoxyphenyl)-1-piperazinyl]ethyl]-N-2-pyridinyl-benzamide([18F]p-MPPF), 2-(1-{6-[(2-[18F]fluoroethyl)(methyl)amino]-2-naphthyl}ethylidine)malononitrile ([18F]FDDNP), 2-[18F]fluoro-α-methyltyrosine, [18F]fluoromisonidazole ([18F]FMISO) and 5-[18F]fluoro-2'-deoxyuridine ([18F]FdUrd).

One embodiment of the present invention relates to a method for a radiosynthesis of a radiolabeled compound. This method includes introducing one or more reagents into the batch device. The batch device comprising a reaction chamber, one or more ports to allow delivery and/or removal of gas and/or liquids into or from the reaction chamber via at least one rotary valve. The method further comprises processing the reagent(s) to generate the radiolabeled compound, and collecting the radiolabeled compound.

In yet another embodiment of the present invention, a residue is deposited on the walls of the reaction chamber after a substantially complete evaporation of the liquid. The residue may comprise a reagent that is used in the reaction, or upon completion of the desired reaction, the residue may comprise the product that is obtained from the reaction.

In yet another embodiment of the present invention, at least one of the gas and the liquid is heated prior to entry to the reaction chamber to effect the reaction or evaporation of the liquid inside the reaction chamber.

In yet another embodiment of the present invention, the method further comprises an internal or external heater for heating the reaction chamber.

Another embodiment of the present invention is directed toward the apparatus described above wherein the controlled temperature range is about −78° C. to about 400° C.

Another embodiment of the present invention is directed toward the apparatus described above wherein the chemical process steps are carried out at ambient temperature.

Another embodiment of the present invention is directed toward the apparatus described above wherein the reactor can be pressurized from about −1 atm to 30 atm.

Another embodiment of the present invention is directed toward the apparatus described above, wherein the flow rate of a carrier/incoming gas is about 0 to about 100 scfm.

Another embodiment of the present invention is directed toward the apparatus described above, wherein the reagents delivered in high concentration/low volume.

Another embodiment of the present invention is directed toward the apparatus described above, wherein a reaction proceeds in high concentration and low volume.

Another embodiment of the present invention is directed toward the apparatus described above, wherein a concentrated reaction product is eluted in high volume/low concentration.

Another embodiment of the present invention is directed toward the apparatus described above, wherein a concentrated reaction product is eluted in low volume/high concentration.

Another embodiment of the present invention is directed toward the apparatus described above, wherein the reactions are heated.

Another embodiment of the present invention is directed toward the apparatus described above, wherein an external source of heat is applied to a bottom part of the reactor (reaction chamber) to affect the chemical process.

Another embodiment of the present invention is directed toward the apparatus described above, wherein internal volume of the reactor is from about 50 µL to about 10,000 L.

Another embodiment of the present invention is directed toward the apparatus described above, wherein the reactor is scalable.

Another embodiment of the present invention is related to a method for radiosynthesis of a radiolabeled compound, comprising introducing one or more reagents into microfluidic chip, the chip comprising a reaction chamber, one or more flow channels connected to the reaction chamber, and one or more integrated rotary valves to effect flow control in and out of the reaction chamber; processing the reagent(s) to generate a radiolabeled compound; and collecting the radiolabeled compound.

Another embodiment of the present invention is directed toward the apparatus described above, wherein the apparatus is microfluidic and the volume of the reactor is about 5 µL to about 1000 µL.

Another embodiment of the present invention is directed toward the apparatus described above wherein the apparatus is microfluidic and the chemical process can be carried out at the temperature of about −78° C. to about 400° C.

Another embodiment of the present invention is directed toward the apparatus described above wherein the apparatus is microfluidic and the chemical process can be carried out under the pressure of about 0 to about 50 psi.

Another embodiment of the present invention is directed toward the apparatus described above wherein the apparatus is microfluidic and the reaction product is obtained in about 1 to about 60 sec.

Another embodiment of the present invention is directed toward the apparatus described above wherein the apparatus is microfluidic and the chemical process is a radiosynthesis of a radiolabeled compound.

Another embodiment of the present invention is directed to a method for a multistep chemical process effected by sequential rotary distribution and delivery of reagents into the reaction chamber (the method) and comprising the following steps:

a) delivering the reagents into the reactor;
b) processing the reagent(s) to generate a desired product; and
c) removing and/or collecting the product.

Another embodiment is directed to the method as described above, wherein one or more reagents delivered in a low concentration are concentrated to a desired volume prior to the next reactant's entry.

Another embodiment is directed to the method as described above and further comprising solvent exchange.

Another embodiment is directed to the method as described above, wherein exchanging solvents provides removal of the residual moisture and promotes the drying of a concentrated residue.

Another embodiment is directed to the method as described above further comprising mixing the reagents to effect a chemical reaction by controlling pressure and temperature in the reactor.

Another embodiment is directed to the method as described above further comprising heating or cooling the reagents to effect a chemical reaction.

Another embodiment is directed to the method as described above further comprising heating the reagents to effect a chemical reaction by an external heat source applied to a bottom part of the reactor (or reaction chamber).

Another embodiment is directed to the method as described above and eluting the product from the reactor for further processing.

Another embodiment is directed to the method as described above wherein the reactor is microfluidic.

Another embodiment is directed to the method as described above for radiosynthesis of a radiolabeled compound.

Another embodiment is directed to a method of sampling of an ongoing chemical reaction for further analysis.

Another embodiment is directed a method of sampling of an ongoing chemical reaction for further analysis wherein the reactor is microfluidic.

Another embodiment is directed to method of sampling of an ongoing chemical reaction for further analysis wherein the chemical reaction is a radiosynthesis of a radiolabeled compound.

The inlet and the outlet may be, for example, configured in the reaction chamber to convey a liquid within the reaction chamber to be removed from the reaction chamber.

While the foregoing description has been primarily described using the embodiment that utilizes one inlet slit, or port for the delivery of gas, it is understood that according to another embodiment of the present invention, the nonflow-through apparatus may be implemented using two or more inlet slits, or ports. One or more of the slits, or ports may be used to deliver the gas and/or one or more liquids to the reaction chamber (234).

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments.

The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems and computer program products.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. An apparatus for carrying out chemical processes, comprising:
    a reaction chamber;
    a lid having one or more lid ports configured to allow delivery or removal of a gas and or a liquid into or from the reaction chamber;
    one or more chamber ports configured to be selectively aligned with an appropriate fluid line carrying a gas and/or a liquid, or a mixture thereof, into or from the reaction chamber via at least one rotary valve, wherein the one or more chamber ports are sealed.

2. The apparatus of claim 1, wherein the rotary valve comprises a stator and a rotor.

3. The apparatus of claim 2, wherein the stator is stationary.

4. The apparatus of claim 2, wherein the rotor is interfaced with a stator via solid-solid contact and mechanical sealing.

5. The apparatus of claim 2 wherein a servo-motor is used to rotate the valve rotor.

6. The apparatus of claim 2 wherein the chamber port is aligned with a selected fluid line by rotation of a valve rotor having a channel capable of providing a connection between the chamber port and the selected fluid line.

7. The apparatus of claim 1, wherein the rotary valve has a movable interface with a side of the reaction chamber to allow selective alignment of the chamber port with an appropriate fluid line carrying a gas and/or a liquid, or a mixture thereof, into or from the reaction chamber.

8. The apparatus of claim 7, wherein at least one chamber port is aligned with the selected fluid line by rotation of the rotary valve.

9. The apparatus of claim 1 wherein at least one chamber port is configured to allow removal of a gas and/or liquids, or a mixture thereof, from the reaction chamber.

10. The apparatus of claim 1 wherein at least one lid port is configured to allow the delivery of a pressurized gas into the reaction chamber.

11. The apparatus of claim 1 wherein at least one rotary valve is activated by a rotary actuator.

12. The apparatus of claim 11, wherein the rotary actuator is pneumatic.

13. The apparatus of claim 11, wherein the chemical process is radiosynthesis.

14. The apparatus of claim 1, wherein the apparatus is microfluidic.

15. A method for a chemical process conducted in a batch apparatus and comprising the following steps:
   a) delivering the reagents into a reaction chamber via a lid having one or more lid ports configured to allow delivery of a gas and or a liquid into the reaction chamber and through one or more chamber ports configured to be selectively aligned with an appropriate fluid line carrying a gas and/or a liquid, or a mixture thereof, into the reaction chamber via at least one rotary valve;
   b) processing the reagent(s) to generate a desired product; and
   c) eluting the product via one or more outlet chamber ports or one or more outlet lid ports via corresponding rotary valves.

16. The method according to claim 15 wherein the apparatus is microfluidic.

17. The method according to claim 16 wherein the chemical process is radiosynthesis.

18. A synthetic chip comprising:
   a reactor; and
   a lid,
   wherein the chip is configured to be compressed and/or sealed between two reagent distribution members or a reagent distribution member and a hard stop.

19. The chip according to claim 18 wherein the reagent distribution member is a rotary valve.

20. The chip according to claim 18, wherein at least one reagent distribution member is a stator.

21. The chip according to claim 18, wherein at least one reagent distribution member is a rotor.

22. An apparatus for carrying out chemical process, comprising:
   a reaction chamber;
   a lid having one or more lid ports configured to allow delivery or removal of a gas and or a liquid into or from the reaction chamber;
   one or more chamber ports configured to be selectively aligned with an appropriate fluid line carrying a gas and/or a liquid, or a mixture thereof, into or from the reaction chamber via at least one rotary valve, wherein the one or more lid ports are sealed.

23. The apparatus of claim 22, wherein the rotary valve comprises a stator and a rotor.

24. The apparatus of claim 23, wherein the chamber port is aligned with a selected fluid line by rotation of a valve rotor having a channel capable of providing a connection between the chamber port and the selected fluid line.

25. The apparatus of claim 22, wherein the rotary valve has a movable interface with a side of the reaction chamber to: allow selective alignment of the chamber port with an appropriate fluid line carrying a gas and/or a liquid, or a mixture thereof, into or from the reaction chamber.

26. The apparatus of claim 25, wherein at least one chamber port is aligned with the selected fluid line by rotation of the rotary valve.

27. The apparatus of claim 22, wherein at least one chamber port is configured to allow removal of a gas and/or liquids, or a mixture thereof, from the reaction chamber.

28. The apparatus of claim 22, wherein at least one lid port is configured to allow the delivery of a pressurized gas into the reaction chamber.

29. An apparatus of claim 22, wherein the apparatus is microfluidic.

30. The apparatus of claim 29, wherein the chemical process is radiosynthesis.

* * * * *